United States Patent [19]

Hammett

[11] Patent Number: 4,488,601
[45] Date of Patent: Dec. 18, 1984

[54] CONTROL OF ALUMINUM CROSS-LINKED POLYACRYLAMIDES FOR SWEEP IMPROVEMENT

[75] Inventor: Robert E. Hammett, Tulsa, Okla.

[73] Assignee: The Standard Oil Company, Chicago, Ill.

[21] Appl. No.: 426,303

[22] Filed: Sep. 29, 1982

[51] Int. Cl.³ .................... E21B 43/22; E21B 33/138
[52] U.S. Cl. .................... 166/270; 166/273; 166/295; 166/300
[58] Field of Search .............. 166/270, 273, 294, 295, 166/300

[56] References Cited

U.S. PATENT DOCUMENTS

| | | | |
|---|---|---|---|
| 3,342,262 | 9/1967 | King et al. | 166/300 X |
| 3,522,844 | 8/1970 | Abdo | 166/270 |
| 3,530,937 | 9/1970 | Bernard | 166/270 |
| 3,593,793 | 7/1971 | Kelseaux | 166/270 |
| 3,762,476 | 10/1973 | Gall | 166/270 X |
| 3,833,061 | 9/1974 | Gall | 166/294 |
| 3,926,258 | 12/1975 | Hessert et al. | 166/295 X |
| 3,952,806 | 4/1976 | Trantham | 166/295 X |
| 3,981,363 | 9/1976 | Gall | 166/270 |
| 4,039,029 | 8/1977 | Gall | 166/270 X |
| 4,120,361 | 10/1978 | Threlkeld et al. | 166/295 X |

Primary Examiner—George A. Suchfield

[57] ABSTRACT

A method and fluid for selectively reducing the permeability of an oil-bearing subterranean formation is disclosed, wherein a cross-linkable polymer, a cross-linking agent and a spacer fluid are alternately injected. The spacer, such as sodium citrate, permits repeated injection cycles of the polymer and cross-linking agents without excessive polymer retention at or near the formation face. Such retention filters out polymers and inhibits polymer propagation throughout the formation. The present invention also permits controlled deep penetration of the cross-linked polymer into the formation to increase oil recovery.

9 Claims, 5 Drawing Figures

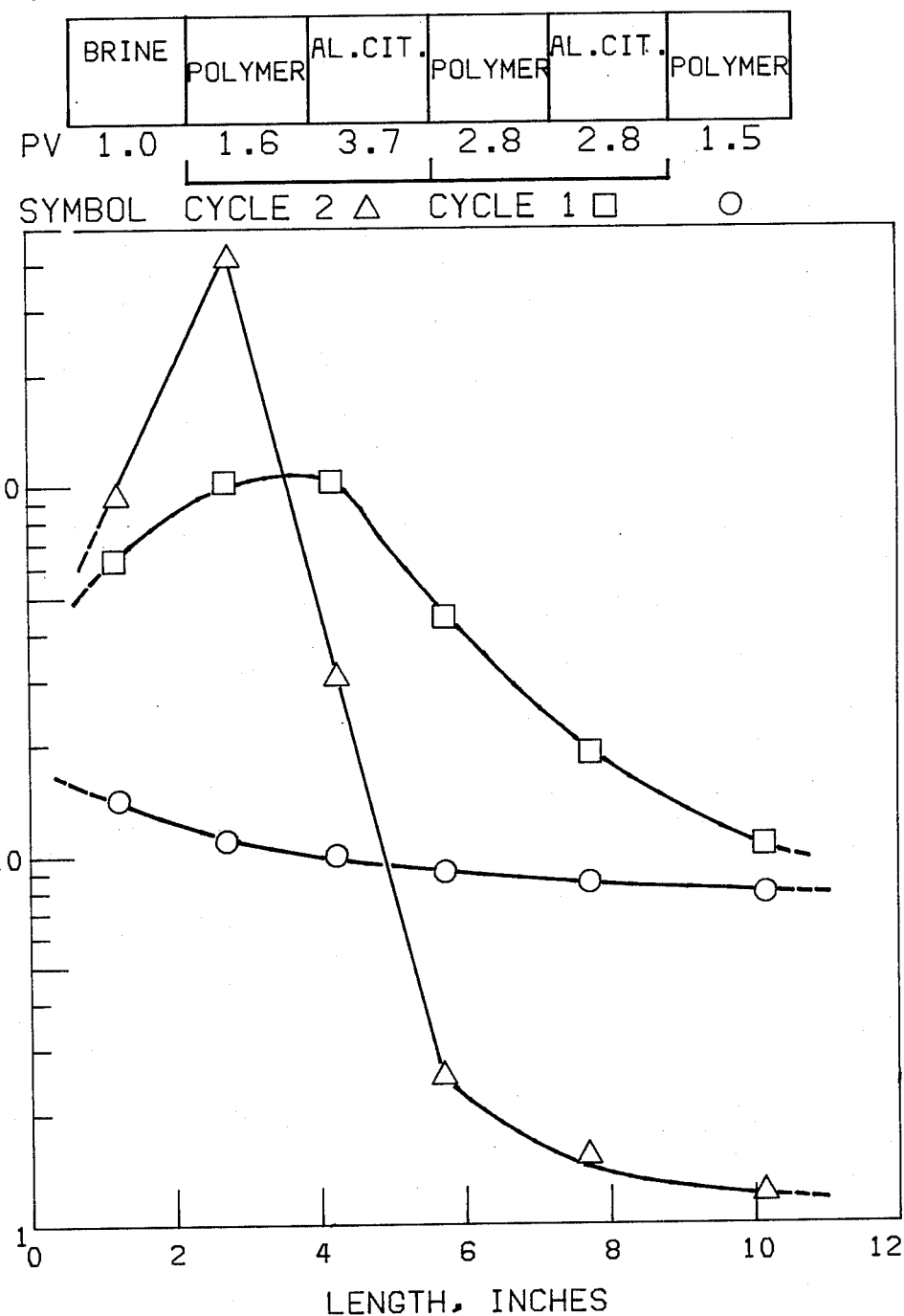

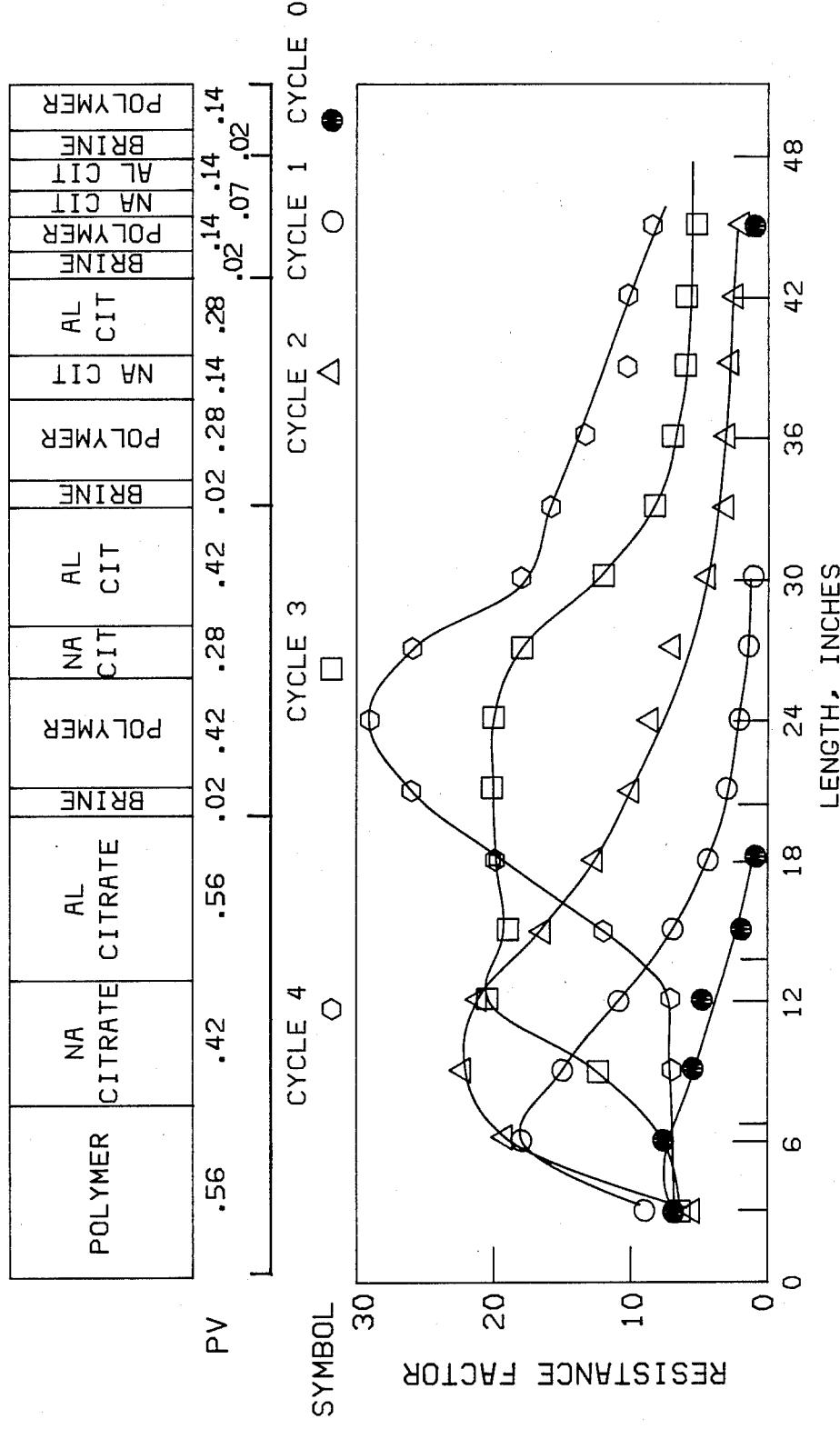

CONTROL OF ALUMINUM CROSS-LINKED POLYACRYLAMIDES FOR SWEEP IMPROVEMENT

BACKGROUND OF THE INVENTION

The present invention relates to a method of controlling the placement of a cross-linked polymer gel in a subterranean formation for reducing permeability and improving sweep control. More specifically, it is concerned with the sequential injection of a slug of a cross-linkable polymer, a cross-linking agent and sequestering agent to achieve deeper polymer placement.

For many decades, the oil and gas industry has recognized the desirability, especially in enhanced oil recovery operations, of being able to selectively control the permeability of hydrocarbon bearing formations in order to reduce unwanted water production and to optimize oil and gas production by reducing the "fingering" of enhanced oil recovery fluids through porous reservoir regions. Thus, concepts such as permeability control, formation plugging, selective fluid placement, mobility control and the like are an integral part and significant feature in many aspects of oil and gas production processes including waterflooding, miscellar flooding and other related processes. In particular, the oil and gas industry has generically suggested and commercially used a variety of water soluble polymer-forming reactants which after being injected into the water bearing portion of the formation are polymerized or gelled such as to reduce the permeability of the previous water producing region. One specific technique involves the placement in the formation of a cross-linkable polymer solution which is followed by a cross-linking agent. In actual commercial implementation, the most frequently suggested polymers are polyacrylamides, polysaccharides, cellulosic polymers and lignosulfonates. Similarly, the most frequently used cross-linking agents are aluminum in the 3+ valence state and the dichromate species.

The process which is of particular relevance to the present invention involves the sequential cyclic injection scheme of introducing an aqueous cross-linkable polymer solution into the subterranean formation followed by a slug of a cross-linking agent made up of a multivalent cation accompanied by a sequestering anion. In U.S. Pat. No. 3,762,476, a process for reducing the quantity of water recovered from a subterranean formation involving the in situ cross-linking of a partially hydrolyzed polyacrylamide with aluminum citrate is disclosed. The claimed process involves the injection of the aqueous polymer solution followed by a slug of complexing ionic solution of multivalent cations and retarding anions capable of gelling the polymer solutions, and then the injection of brine, followed by a second injection of the polymer solution. The brine serves to prevent premature polymer cross-linking in the injection lines prior to actual injection into the formation. In U.S. Pat. No. 3,833,061, the polymer/cross-linking agent/polymer injection sequence is improved by preflushing the formation with a solution containing an oxidizing agent to remove hydrocarbons from the surface of the formation prior to in situ gelation of the polymer. In U.S. Pat. No. 3,926,258, a single slug injection scheme is proposed wherein the cross-linkable polymer is placed in solution with a multivalent cation cross-linking agent at a valence state above the lower valence state which promotes cross-linking, plus a complexing agent and a reducing agent, thus achieving a delayed gelation and extended gel time for deeper formation penetration. In U.S. Pat. No. 3,981,363, the basic two-step sequential injection of polymer/cross-linking agent is modified in that the polymer is partially cross-linked prior to injection.

Although these processes have been commercially implemented and have met with at least partial success, a still-unresolved problem, prior to the present invention, involved the tendency for excessive polymer retention at the face of the formation in the wellbore where injection occurs, particularly after repeated injection cycles. This excessive polymer retenion led to severely limited penetration of the polymer through the formation, and reduced the effectiveness of the polymer in reducing formation permeability.

SUMMARY OF THE INVENTION

A method for treating a subterranean formation involving the sequential injection of, first, an aqueous solution of a cross-linkable polymer solution (e.g., polyacrylamide) followed by an aqueous solution of a cross-linking agent consisting of a multivalent cation and a retarding anion (e.g., aluminum citrate) and thereafter injecting an aqueous salt solution of an alkaline metal cation and a sequestering anion. Repeated injection cycles of this three-step scheme alleviates the problem of formation plugging at the wellbore due to excessive polymer retention previously experienced during a two-step scheme of polymer solution injection followed by a cross-linking agent. The present invention permits controlled deep penetration of the cross-linked polymer into the formation without formation plugging at the wellbore.

BRIEF DESCRIPTION OF THE DRAWINGS

FIG. 1 is a graphic representation of a prior art polymer injection sequence as disclosed in U.S. Pat. No. 3,762,476.

FIG. 2 is a graphic representation of the injection sequence of an embodiment of the present invention.

DETAILED DESCRIPTION OF THE INVENTION

Figure 3A:
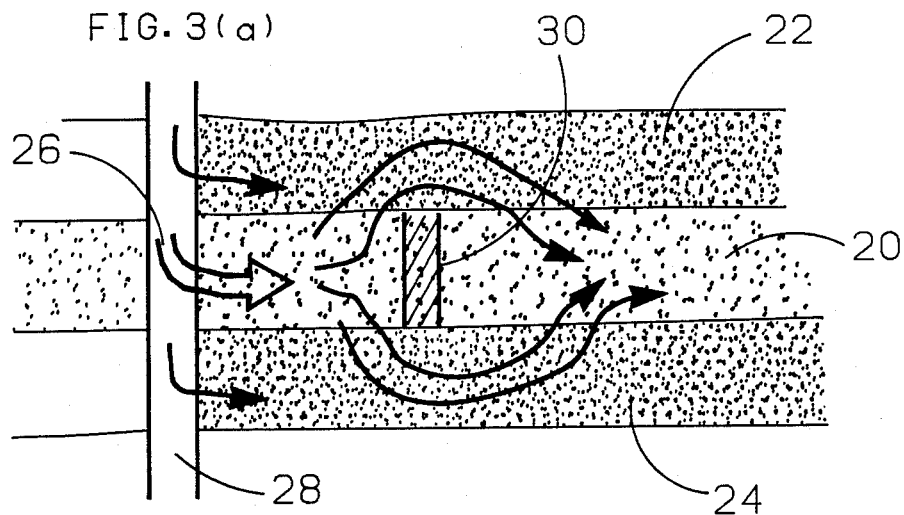
FIGS. 3(A)-3(B) is a schematic view of reservoir response to the injection sequence of an embodiment of the present invention.

It is believed that a better appreciation of the significance of the present invention may be gained if the approach disclosed in U.S. Pat. No. 3,762,476 is first reviewed. As used herein, "resistance factor" (RF) is defined as the permeability reduction achieved during the polymer cross-linking treatment or polymer injection, and "residual resistance factor" (RRF) is defined as the retained permeability reduction after water injection subsequent to the polymer/cross-linking agent treatment.

The procedure disclosed in U.S. Pat. No. 3,762,476 to achieve in situ cross-linking involves the sequential injection of aqueous solutions of polymer and cross-linking agents. An initial injection of polymer is thought to provide the absorbed or retained polymer for succeeding cycles of the cross-linker and polymer solutions. Under this theory the injection of the cross-linking solution attaches a metal ion (as described in greater detail below) to the retained polymer and prepares the retained polymer molecules to cross-link with the next injected polymer slug, resulting in a layer of cross-linked polymer which has a greater RF and RRF than does the polymer alone. The next slug of polymer cross-links with the retained polymer at the sites of retained metal ions and plugs off a portion of the permeable area to flow. After successive injections of polymer, flow through the porous zones can be substantially reduced.

While numerous different polymers can be used herein (and which are noted hereinafter), unless noted otherwise, the core tests reported herein were performed with a mildly sheared and filtered Dow Pusher 700 solution, a polyacrylamide manufactured by Dow Chemical Company. The purpose in using a mildly sheared polymer is to simulate polymer behavior in a field situation. The Pusher 700 was produced by forcing the unsheared, diluted polymer through a 7 micron stainless steel filter (NUPRO SS 4FE 7) by applying 25 psi air pressure to a transfer vessel containing the polymer. The approximate shear rate was 3500 sec$^{-1}$.

A core resistance profile performed in accordance with known technology is shown in FIG. 1. In this test, a saturation flood was performed and each injection sequence was terminated when no change in pressure was detected throughout the core. After two cycles of the aluminum citrate-polymer sequence, essentially all of the flow resistance occurred in the first few inches of the core. As can be seen in FIG. 1, the line representing the initial polymer injection has a maximum RF of about 14.0, whereas after the first full injection cycle, the RF has increased to approximately 100, and after the second full injection cycle the RF has increased to approximately 400. The downstream RF values, especially after the second injection sequence, are markedly reduced because, it is thought, of the inability of the polymer to penetrate the cross-linked polymer plug in the first few inches of the core. The decrease in the downstream RF after each additional injection sequence may be due to the penetration of the aluminum citrate slug which further delinks and dilutes a portion of the polymer that has penetrated. In order to overcome this effect, it is thought that a significantly greater volumes of polymer need to be injected as the number of cycles increases.

Two methods proposed for obtaining deeper polymer propagation are using shear degraded polymers or hydrating the polymer in a high salinity brine. Each of these methods reduces the physical volume of the polymer molecules and results in lower resistance level increases for each cross-linking cycle. Each of these is undesirable due to the concurrent decrease in effective molecular size (occupied volume) of the polymer and consequent decrease in porosity reduction.

Therefore, the present invention contemplates the use of a spacer consisting of an alkaline metal cation and a sequestering anion between the cycles of polymer + cross-linker solution (multivalent cation and sequestering anion). It is thought that the anion of the spacer of the present invention will remove a portion of the multivalent cations previously injected into and retained by the polymer network near the injection site in the wellbore and therefore permit subsequently injected polymer to propagate deeper into the formation (without being cross-linked at the face of the formation). The in situ formation of a polymer network requires that the cross-linker solution contact the polymer molecules, so that when the solutions are injected alternately, the cross-linker must interact with the adsorbed polymer portion of the previously injected polymer solution. Therefore, more effective permeability modifications can be obtained with water soluble polymers that possess the property of residual resistance.

Suitable polymers for use herein are not limited to, but can be selected from the group comprising of polyacrylamides, partially hydrolyzed polyacrylamides, polysaccharides, carboxymethylcellulose, polyvinyl alcohol, polystyrene sulfonates, polyacrylonitriles, partially hydrolyzed polyacrylonitriles, polyacrylic acid, polyvinylpyrrolidone, copolymers of acrylonitrile with acrylic acid or 2-acrylamido-2-methyl-1-propane sulfonic acid, and the like.

Additional polymers for use in the present invention include copolymers of acrylamide and acrylic acid or other vinylic or polyolefinic monomers, partially hydrolyzed copolymers of acrylamide and acrylic acid or other vinylic monomers, copolymers of acrylonitrile and acrylic acid or other vinylic or polyolefinic monomers, partially hydrolyzed copolymers of acrylonitrile and acrylic acid or other vinylic or polyolefinic monomers, copolymers of acrylic acid and other vinylic or polyolefinic monomers, partially hydrolyzed copolymers of acrylic acid and other vinylic or polyolefinic monomers methylolated or sulfomethylolated forms of the above.

While the molecular weight of the polymer will probably vary with the particular formation characteristics, it is anticipated that a molecular weight of from 500,000 to 1 million is acceptable. The permeability of the formation and composition of the formation brine will determine what molecular weight polymer is used.

The polymer solutions can be prepared in either fresh water or formation brine. However, because formation brines may cause some shortening of the polymer molecule, it may be desirable to prepare the polymer solutions in fresh water using a presheared polymer. The concentration of the polymer in the solution can range from about 100 to about 10,000 ppm, more usually from about 250 to about 1,000 ppm.

The cross-linking agents useful in the present invention are prepared by reacting a multivalent cation selected from the group comprising, but not limited to, $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$ and a retarding anion selected from the group comprising, but not limited to, ethylenediamine-tetracetic acid (EDTA) acetate nitrilotriacetate, tartrate, citrate, tripolyphosphate, metaphosphate, gluconate, and orthophosphate.

The novel spacers of the present invention comprise an alkali metal or ammonium cation and a sequestering anion. A multivalent cation complexing agent such as citric acid, tartaric acid, maleic acid or the alkaline salt of these acids provides an economical method of maintaining a high level of aluminum ion in solution. The alkali metal cation useful herein can be chosen from the group comprising, but not limited to, potassium or sodium. The sequestering anion suitable for use in the spacer herein includes, but is not limited to, EDTA, acetate nitrilotriacetate, tartrate, citrate, tripolyphosphate, metaphosphate, gluconate, and orthophosphate.

The injection of the polymer and cross-linker can be done sequentially or the polymer and cross-linker can be mixed prior to injection, although the latter can result in a much greater change of filtering out substantial amounts of polymer at the formation face thereby resulting in plugging. The cross-linking process can be controlled somewhat and plugging reduced by adjusting the solution pH, temperature and concentration of the multivalent metal cation. However, the process is preferably performed sequentially with alternate injections of polymer and cross-linking agents.

A novel spacer which Applicant has found to give acceptable results is sodium citrate. It is thought that citrate ion from the novel spacer forms a water soluble complex with the multivalent cation as, for example, aluminum, and releases a portion of the polymer previously cross-linked to a prior layer of polymer of the cation. The citrate-aluminum complex is then forced deeper into the formation where it reacts with the the polymer and provides future cross-linking potential. Assuming appreciable shear or breakage of the polymer does not occur, the previously cross-linked polymer can be driven deeper into the formation to provide future cross-linking potential.

The method of the present invention can be practiced in a saturation flood (wherein the polymer and multivalent cation are injected until injected solution is detected at a core exit, with a sodium citrate spacer therebetween) or a progressive small slug flood (wherein volumes of injected blends are gradually increased in successive cycles). The expense involved in injecting the large quantities of a saturation flood militate against its use and the experiments conducted by applicant have indicated the use of a progressive small slug flood to be more cost effective. The progressive small slug flood uses less than one pore volume quantity of each solution in a cycle. By gradually increasing the injected pore volume per cycle, the entire core (or formation) pore volume can be exposed to an RF greater than about 20 as compared to a polymer RF of about 12 to 14. As shown in FIG. 2, the polymer and aluminum citrate slug sizes were increased by 0.14 pore volume (the fluid volume of the pay zone in the formation under consideration) for each injection cycle. The sodium citrate spacers were increased by 0.14 pore volumes to provide increasing penetration of uncrosslinked polymer solutions. The approximate maximum RF for the uncross-linked polymer is about 7 and the maximum RF range for the cross-linked polymer is 20-30.

The mole ratio of aluminum ion to citrate ion in the cross-linking solution can be from about 1:1 to about 4:1. The preferred mole ratio of aluminum:citrate is 2:1. It has been found that a mole ratio of 1:1 or less results in insufficient polymer cross-linking due to the unavailability of aluminum ions, while a ratio of 4:1 may result in aluminum hydroxide precipitation in the formation due to insufficient citrate.

Increasing the salinity of the polymer solution will tend to reduce the observed viscosity, RF and RRF, as well as reducing the degree to which the polymer is cross-linked. Increasing the salinity of the brine will decrease the effectiveness of the process due to the lower RF and RRF, but should increase the depth of penetration of the cross-linked polymer.

Figure 3B:
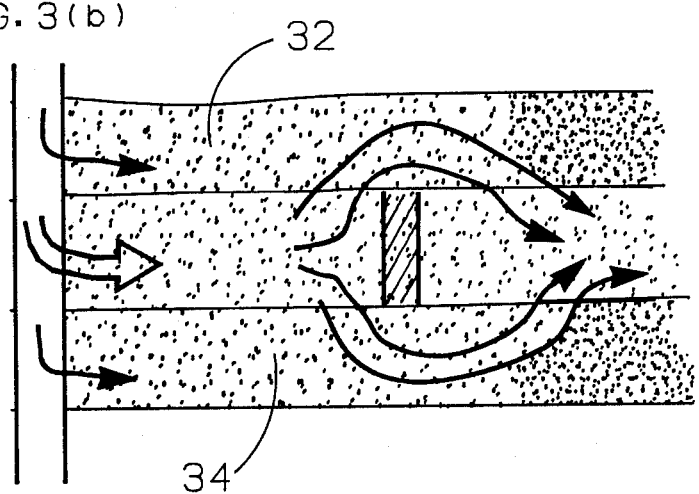

The method of the present invention can be useful when it is desired to move a bank of high flow resistance through a formation or reservoir. Extremely high RF's can be generated in localized portions of formations which may be utilized to increase oil recovery under appropriate conditions. As shown in FIG. 3(a), a highly permeable formation 20 is bounded by one or more oil-bearing formations 22, 24, having relatively lower permeability. After primary recovery of the formations has ceased and the reservoir is undergoing waterflooding, the water 26 injected in wellbore 28 has a tendency to preferentially enter formation 20, due to its high permeability, as opposed to less permeable formations 22, 24. The polymer "block" 30 injected into formation 20 tends to divert water 26, which is injected under pressure, into adjacent oil-bearing formations 22, 24, thereby recovering oil from formations 22, 24, which would otherwise not be recovered by waterflooding. By injecting subsequent cycles of polymer + cross-linker + spacer, the polymer plug 30 can be moved through the reservoir, as in FIG. 3(b), to permit recovery of oil from formations, as at 32, 34. In this manner, the wellbore region is maintained unplugged with low permeability reduction (equal to the polymer RF) and as each cross-linked cycle is completed, the injected polymer slug will progressively invade deeper into the formation.

Figure 4:
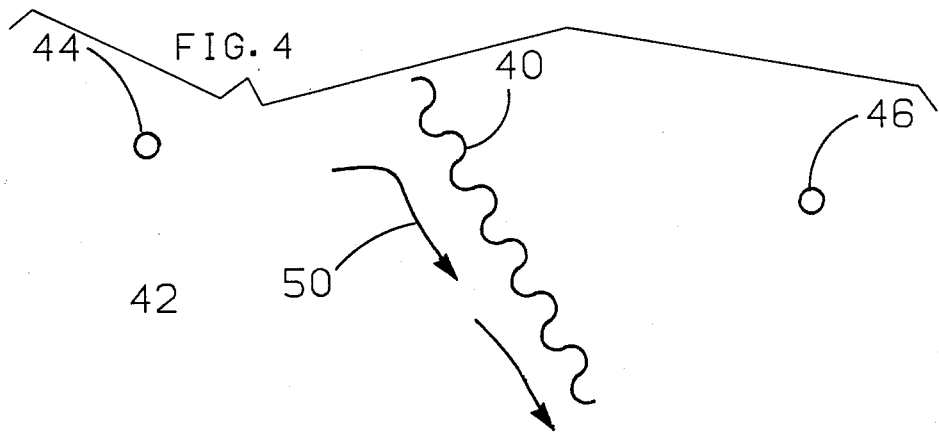
FIG. 4 represents the effect of reservoir discontinuities on fluid floods of reservoirs.

When undergoing waterfloods, noncommunicating fractures may rob a waterflood of much of its effectiveness. As shown in FIG. 4, a fracture 40 through reservoir 42 may divert a substantial portion of the water 50 injected through injection well 44, thereby reducing the oil produced at production well 46.

By propagating a polymer slug or "block" through the reservoir as described above, and by emplacing the block upstream of the fracture in the object formation, the fracture 40 can be sealed off. Subsequent waterflooding bypasses the fracture and oil recovery from reservoir 42 is increased.

An additional effect of increasing the aluminum citrate, polymer and sodium citrate slug pore volume in successive cycles is that the RF maximum is broadened for each successive cycle. As shown in FIG. 2, approximately 80% of the core is exposed to an RF of greater than 10 after a total of only 3.85 pore volume total fluids in the method of the present invention. Without the use of the sodium citrate, applicant has found that at least six pore volumes polymer and four pore volumes aluminum citrate would be necessary to complete three cross-linked cycles in the formation while resulting in a much narrower RF coverage. Therefore, the injection time and chemical costs are substantially reduced using the method of the present invention.

Reasonable variation and modification are possible within the scope of the foregoing disclosure and the appended claims, and it should be understood that this invention is not to be unduly limited thereby.

I claim:

1. A method of treating a subterranean formation, comprising the steps of sequentially injecting into the formation:
   (a) an aqueous solution of a cross-linkable polymer;
   (b) an aqueous solution of a cross-linking agent comprising multivalent cations suitable for cross-linking the polymer and sequestering anions; and
   (c) an aqueous solution of a salt comprising cations selected from the group consisting of alkali metal cations and sequestering anions.

2. A method of claim 1 wherein steps a, b, and c are repeated sequentially.

3. The method of claims 1 or 2 wherein said cross-linkable polymer is selected from the group consisting of: polyacrylamide, partially hydrolyzed polyacrylamide, polysaccharide, carboxymethylcellulose, polyvinyl alcohol, polystyrene sulfonates, polyacrylonitrile, polyacrylic acid, polyvinyl pyrrolidone, copolymers of acrylonitrile with acrylic acid and 2-acrylamido-2-methyl-1-propane sulfonic acid;

said multivalent cations are selected from the group consisting of: $Fe^{2+}$, $Fe^{3+}$, $Al^{3+}$, $Ti^{4+}$, $Zn^{2+}$, $Sn^{4+}$, $Ca^{2+}$, $Mg^{2+}$ and $Cr^{3+}$;

said sequestering anions are selected from the group consisting of: ethylenediaminetetraacetic acid, acetate nitrilotriacetate, tartrate, citrate, tripolyphosphate, metaphosphate, gluconate, and orthophosphate;

and said alkali metal cation is selected from the group consisting of: potassium and sodium.

4. The method of claims 1 or 2 wherein said cross-linkable polymer is polyacrylamide, said cross-linking agent is aluminum citrate and said salt is sodium citrate.

5. The method of claims 1 or 2 wherein said aqueous solution of a cross-linkable polymer is a solution of mildly sheared polyacrylamide containing from about 100 ppm to about 10,000 ppm by weight polyacrylamide;

said aqueous solution of a cross-linking agent is a solution of aluminum citrate containing from about 100 ppm to about 5000 ppm by weight aluminum citrate;

and said aqueous solution of a salt comprises a solution of sodium citrate, the concentration of which is determined by the concentration of divalent cations in the formation.

6. The method of claim 4 wherein the mol ratio of aluminum ion to citrate ion is about 1:1 to about 4:1.

7. The method of claim 2 wherein injection of solutions in successive cycles of steps a, b and c comprises increasing the pore volumes of the solutions with each cycle.

8. The method of claim 7 wherein less than 4.0 pore volumes is injected in multiple cycles of steps a–c.

9. A method of displacing oil through a subterranean oil-bearing formation having high permeability portions therein, said formation being penetrated by at least one producing well, comprising the steps of sequentially injecting into said formation:

(a) an aqueous solution of a cross-linkable polymer;
(b) an aqueous solution of a cross-linking agent comprising multivalent cations and sequestering anions;
(c) an aqueous solution of a salt comprising alkali metal or ammonium cations and sequestering anions; and
(d) an aqueous fluid into said formation and displacing oil toward said producing well.

* * * * *